UNITED STATES PATENT OFFICE.

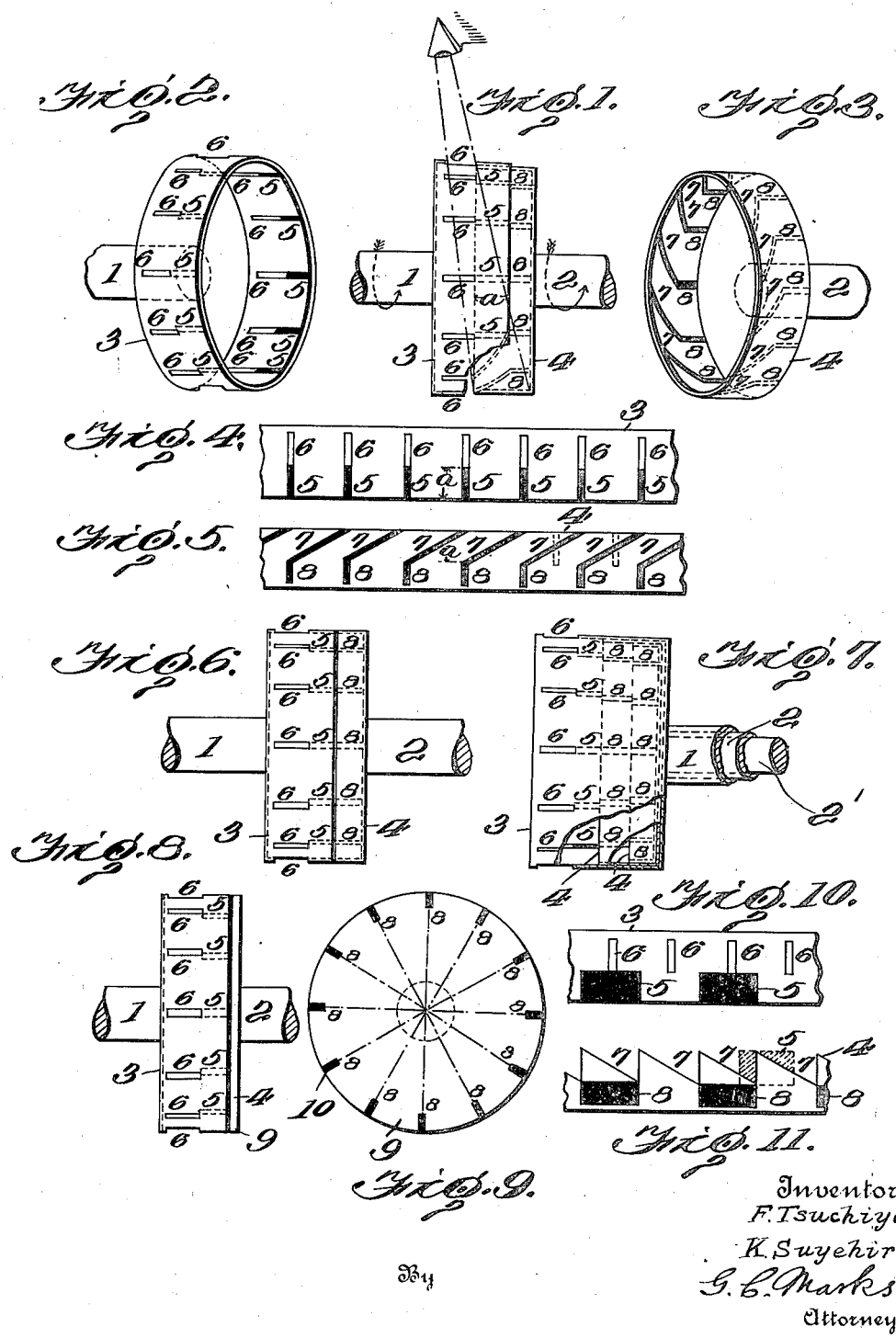

FUJIMARU TSUCHIYA, OF HIRANO, KOBE, AND KYOJI SUYEHIRO, OF HONGO, TOKYO, JAPAN.

APPARATUS FOR COMPARING ROTATION OF SHAFTS.

1,316,820.     Specification of Letters Patent.     Patented Sept. 23, 1919.

Application filed June 22, 1917. Serial No. 176,454.

*To all whom it may concern:*

Be it known that we, FUJIMARU TSUCHIYA and KYOJI SUYEHIRO, subjects of the Emperor of Japan, residing at No. 125 Umemotocho, Hirano, Kobe, Japan, and No. 16 Komagome Akebonocho, Hongo, Tokyo, Japan, have invented certain new and useful Improvements in Apparatus for Comparing Rotation of Shafts, of which the following is a specification.

This invention relates to an apparatus for comparing the speed of rotation of a series of shafts.

The object of this invention is to provide two or more cylinders concentrically arranged one within the other and the outer cylinder provided with slits in its circumference and the remaining cylinders having slits or marks so that upon the rotation of the cylinders the relative displacement of the marks in respect to the slits is observed. By this it will be seen that the relative speed and phases of two or more bodies can be determined so that they can be controlled or adjusted so that they will rotate at the same speed for the purpose of putting in a clutch between them or to compare the speeds and phases thereof, or detect the amount of slip of a tachometer in measuring the speed of rotating shafts.

In the accompanying drawings:

Figure 1 is a side elevation of our improved apparatus for comparing the rotation of two shafts having their ends facing each other.

Fig. 2 is a perspective view of one shaft and the cylinder carried thereby.

Fig. 3 is a perspective view of the other shaft and the cylinder carried thereby.

Fig. 4 shows a plan view of the cylinder shown in Fig. 2.

Fig. 5 shows a plan view of the cylinder shown in Fig. 3.

Fig. 6 is a side elevation of a modified form of apparatus a part of the marks being omitted.

Fig. 7 is a side elevation of a further modification of the apparatus as applied to three shafts.

Fig. 8 is a side elevation of a still further modification of the apparatus in which one of the cylinders is replaced by a disk.

Fig. 9 is a side elevation of the disk employed in the modification shown in Fig. 8.

Fig. 10 is a plan view of a portion of the cylinders having a different form of marking.

Fig. 11 is a plan view of a portion of the cylinders having a still further different or modified form of marking.

Referring now to Figs. 1, 2 and 3 of the drawings 1 and 2 represents two shafts the rotation of which are to be compared and the axis of the two shafts is in one and the same straight line so that their ends are opposite each other. The end of the shaft 1 is fitted with a cylinder 3 and the shaft 2 with a cylinder 4, the cylinder 4 fitting in the cylinder 3 for a portion of its length as clearly shown in Fig. 1 of the drawings. While we have shown the cylinder 4 fitting in the cylinder 3 it will be understood that the cylinder 3 could be made smaller to fit within the cylinder 4.

The cylinder 3 as shown in Figs. 1 and 2 is provided on its inner surface with a series of marks 5 spaced uniformly along the circumference and extending longitudinally. The number of these marks may be varied according to the purpose for which it is used, for instance, when the shafts 1 and 2 are to be coupled together by means of a dog clutch having twelve teeth, the cylinder will have twelve marks on it. The cylinder 3 is also provided with slits 6 extending longitudinally thereof from the ends of the marks 5 and which correspond in number to that of the marks, and by these slits the marks 5 on the opposite side of the cylinder can be observed, as will be hereinafter more fully described. While we have shown the slits 6 of the same number as the marks 5 it will be understood that this is not necessary as the number of slits and marks need not correspond.

The cylinder 4 as shown in Fig. 3 is provided on its inner face with marks 8 or their equivalents, spaced uniformly along the circumference thereof and which extend longitudinally. Extending from the inner end of the marks 8 on the inner circumference of the cylinder are the oblique marks 7 which extend at an angle to the longitudinal direction of the shaft. When the marks 5 and 7 are painted or otherwise placed on the cylinders the cylinder 3 must be made of some transparent material or at least a portion thereof must be, but when 5 and 7 are slits the cylinder can be made of metal or other opaque material.

When the cylinders 3 and 4 are in the position shown in Fig. 1 and the shafts 1 and 2 rotated by placing the eye in the position shown in Fig. 1 an observer can see each of the successive marks 5 for a very short time through the slits 6 in the opposite side of the cylinder. It is a known principle of the zoetrope that these marks can be seen the same as if they were standing still. Thus the marks 5 can always be seen through the slits 6 but the marks 8 on the cylinder 4 cannot be very clearly seen when the speed of rotation of the shaft differs from that of the shaft 2. The marks 7 being obliquely arranged may be seen when the rate of rotation of the two shafts differs considerably. The points of intersection of the marks 5 and 7 vary according to the change of speeds of the two rotating shafts, so that the marks 7 seem as if they traveled forward or backward over the marks 5 in the direction of the axis of the shafts. Thus, by observing the state of relative displacement of the two sets of marks 5 and 7 an observer can determine which shaft is traveling faster or slower than the other. Moreover by the position of the points of intersection an observer can determine the difference of phases of the shafts by the extent of the pitch of the marks 5, Fig. 5. When the rotating speeds of the two shafts are made nearly equal by any suitable control or adjustment the marks 8 will become clearly visible to the eye. Therefore in this case, the relative speed of the two shafts can be determined by observing the successive relative position of the marks 5 and 8 without referring to the marks 7. Therefore when the speeds of the two shafts do not differ much from each other the rate of rotation of shafts 1 and 2 can be compared without having the marks 7, and therefore without having the two cylinders telescoping each other.

The foregoing description is for shafts when the ends abut or stand face to face, but when differently arranged as shown in Fig. 7 the same results can be obtained by making one shaft say shaft 2 pass through the other shaft 1 and thus make the cylinder 4 pass through the cylinder 3. The shaft 2 could also be made hollow to allow a third shaft $2^1$ to pass therethrough for comparing the speeds of three shafts.

In the event that it is not convenient to use two cylinders one of the cylinders may be dispensed with and substituted therefor is a disk 9 as shown in Figs. 8 and 9, said disk having marks 10 adjacent its outer periphery. While we have shown the marks 5, 7 and 8 of comparatively thin lines, it will be understood that the same could be varied as to size and shape as shown in Figs. 10 and 11.

Claims:

1. An apparatus for comparing the rotation of shafts, comprising cylinders attached to the shafts and telescoping each other, the outer cylinder having marks on its inner periphery, and provided with slits to make the opposite side of the inner periphery of the inner cylinder visible, substantially as set forth.

2. An apparatus for comparing the rotation of shafts, comprising cylinders attached to the shafts and telescoping each other, and the outer cylinder provided with slits to make the opposite side of the inner periphery of the inner cylinder visible and said inner periphery having marks thereon, for the purpose described.

3. An apparatus for comparing the rotation of shafts, comprising cylinders attached to the shafts and telescoping each other, and the outer cylinder provided with slits to make the opposite side of the inner periphery of the inner cylinder visible and the said inner periphery having thereon marks arranged at an angle, for the purpose described.

4. An apparatus for comparing the rotation of shafts, comprising cylinders attached to the shafts and telescoping each other and the outer cylinder provided with slits to make the opposite side of the inner cylinder visible, the inner periphery of the inner cylinder having marks of suitable width and arranged at an angle, whereby the rotating speed and phases of the shafts is compared by observing the relative displacement of the slits and the marks, substantially as described.

5. An apparatus for comparing rotation of shafts, comprising cylinders attached to the shafts and the outer cylinder provided with slits to make the opposite inner periphery of the cylinder visible, the inner periphery of one cylinder provided with marks of the desired width and suitable pitch and the other cylinder having oblique marks, whereby the rotating speed and phases of the shafts are compared by observing the change of the points of intersection of the said sets of marks through the slits, substantially as set forth.

In testimony whereof we have hereunto set our hands in presence of two subscribing witnesses.

FUJIMARU TSUCHIYA.
KYOJI SUYEHIRO.

Witnesses:
 GENJI KURIBARA,
 SUGAO SOJA.